(12) United States Patent
Shaw et al.

(10) Patent No.: US 10,856,029 B2
(45) Date of Patent: Dec. 1, 2020

(54) PROVIDING LOW AND HIGH QUALITY STREAMS

(71) Applicant: PIKSEL, INC., Wilmington, DE (US)

(72) Inventors: Philip Shaw, York (GB); Peter Heiland, Dover, MA (US); Mark Christie, London (GB); Ralf Tilmann, Mannheim (DE); Kristan Bullet, York (GB); Hans-Jurgen Maas, Mainz (DE)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/736,483

(22) PCT Filed: Jun. 15, 2016

(86) PCT No.: PCT/EP2016/063802
§ 371 (c)(1),
(2) Date: Dec. 14, 2017

(87) PCT Pub. No.: WO2016/202887
PCT Pub. Date: Dec. 22, 2016

(65) Prior Publication Data
US 2018/0199082 A1    Jul. 12, 2018

Related U.S. Application Data

(60) Provisional application No. 62/175,878, filed on Jun. 15, 2015.

(51) Int. Cl.
*H04N 21/262* (2011.01)
*H04N 21/231* (2011.01)
(Continued)

(52) U.S. Cl.
CPC ...... *H04N 21/26233* (2013.01); *H04H 60/46* (2013.01); *H04L 65/607* (2013.01); *H04N 21/2187* (2013.01); *H04N 21/21805* (2013.01); *H04N 21/232* (2013.01); *H04N 21/235* (2013.01); *H04N 21/2343* (2013.01); *H04N 21/2353* (2013.01); *H04N 21/2358* (2013.01);
(Continued)

(58) Field of Classification Search
CPC combination set(s) only.
See application file for complete search history.

(56) References Cited

U.S. PATENT DOCUMENTS 5,852,435 A * 12/1998 Vigneaux ............. G11B 27/031
345/428
8,768,142 B1    7/2014 Ju
(Continued)

FOREIGN PATENT DOCUMENTS

CN    102 802 021 A    11/2012

OTHER PUBLICATIONS

Wen Gao, et al., "Vlogging: A Survey of Videoblogging Technology on the Web", ACM Comput. Surv. 42, ACM, NY, NY, Jun. 23, 2010.
(Continued)

*Primary Examiner* — Alexander Q Huerta
(74) *Attorney, Agent, or Firm* — Holzer Patel Drennan

(57) ABSTRACT

There is provided a technique in which a device for capturing an event, and for generating a first stream and a second stream representing the event, one of the first and second streams being a lower quality version of the other, and the streams being generated simultaneously.

15 Claims, 3 Drawing Sheets

(51) Int. Cl.

| | | |
|---|---|---|
| *H04N 21/232* | (2011.01) | |
| *H04N 21/235* | (2011.01) | |
| *H04N 21/24* | (2011.01) | |
| *H04N 21/242* | (2011.01) | |
| *H04N 21/2665* | (2011.01) | |
| *H04N 21/2668* | (2011.01) | |
| *H04N 21/4223* | (2011.01) | |
| *H04N 21/43* | (2011.01) | |
| *H04N 21/4402* | (2011.01) | |
| *H04N 21/442* | (2011.01) | |
| *H04N 21/482* | (2011.01) | |
| *H04N 21/6332* | (2011.01) | |
| *H04N 21/84* | (2011.01) | |
| *H04N 21/8547* | (2011.01) | |
| *H04N 21/433* | (2011.01) | |
| *H04N 21/443* | (2011.01) | |
| *H04N 21/81* | (2011.01) | |
| *H04N 21/2343* | (2011.01) | |
| *H04N 21/8358* | (2011.01) | |
| *H04N 21/414* | (2011.01) | |
| *H04N 21/218* | (2011.01) | |
| *H04N 21/2187* | (2011.01) | |
| *H04N 21/633* | (2011.01) | |
| *H04H 60/46* | (2008.01) | |
| *H04N 21/234* | (2011.01) | |
| *H04L 29/06* | (2006.01) | |
| *H04N 21/254* | (2011.01) | |
| *H04N 21/266* | (2011.01) | |
| *H04N 21/258* | (2011.01) | |

(52) U.S. Cl.
CPC . *H04N 21/23106* (2013.01); *H04N 21/23418* (2013.01); *H04N 21/23439* (2013.01); *H04N 21/234336* (2013.01); *H04N 21/2402* (2013.01); *H04N 21/242* (2013.01); *H04N 21/2407* (2013.01); *H04N 21/2541* (2013.01); *H04N 21/25866* (2013.01); *H04N 21/2665* (2013.01); *H04N 21/2668* (2013.01); *H04N 21/26208* (2013.01); *H04N 21/26613* (2013.01); *H04N 21/414* (2013.01); *H04N 21/41407* (2013.01); *H04N 21/4223* (2013.01); *H04N 21/433* (2013.01); *H04N 21/4305* (2013.01); *H04N 21/4307* (2013.01); *H04N 21/4331* (2013.01); *H04N 21/4334* (2013.01); *H04N 21/44029* (2013.01); *H04N 21/4431* (2013.01); *H04N 21/44204* (2013.01); *H04N 21/440236* (2013.01); *H04N 21/440263* (2013.01); *H04N 21/4828* (2013.01); *H04N 21/633* (2013.01); *H04N 21/6332* (2013.01); *H04N 21/8186* (2013.01); *H04N 21/8358* (2013.01); *H04N 21/84* (2013.01); *H04N 21/8547* (2013.01)

(56) References Cited

U.S. PATENT DOCUMENTS

| | | | |
|---|---|---|---|
| 2009/0085740 A1* | 4/2009 | Klein | H04N 21/2662 340/540 |
| 2009/0148124 A1* | 6/2009 | Athsani | H04N 21/84 386/241 |
| 2011/0102670 A1* | 5/2011 | Tanji | H04N 21/2743 348/384.1 |
| 2011/0206351 A1* | 8/2011 | Givoly | G11B 27/034 386/283 |
| 2013/0235215 A1* | 9/2013 | Okada | H04N 5/77 348/207.1 |
| 2013/0339539 A1* | 12/2013 | Scherlis | H04N 21/8455 709/231 |
| 2014/0281011 A1* | 9/2014 | Zarom | H04L 65/602 709/231 |
| 2015/0043892 A1* | 2/2015 | Groman | H04N 21/4627 386/278 |
| 2016/0292511 A1* | 10/2016 | Ayalasomayajula | G06K 9/00751 |
| 2017/0311034 A1* | 10/2017 | Nishi | G06T 5/009 |
| 2017/0345459 A1* | 11/2017 | Manville | H04N 21/23439 |
| 2018/0184138 A1* | 6/2018 | Shaw | H04N 21/4431 |

OTHER PUBLICATIONS

International Search Report and Written Opinion for corresponding International Patent Application PCT/EP2016/063802, European Patent Office, dated Sep. 26, 2016.

* cited by examiner

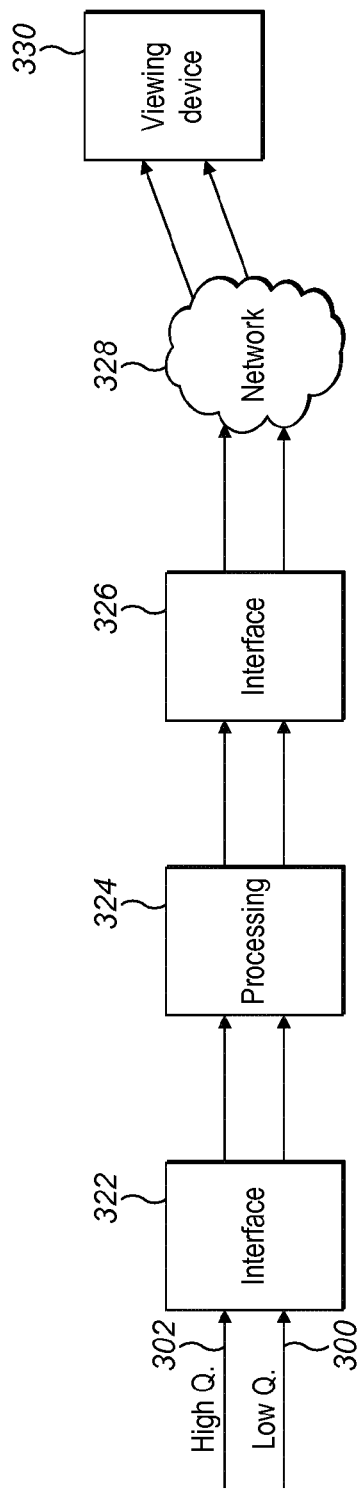
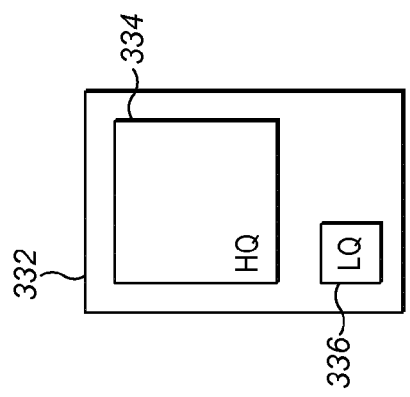

PROVIDING LOW AND HIGH QUALITY STREAMS

BACKGROUND TO THE INVENTION

Field of the Invention

The present invention relates to provision of parallel data streams of the same content, with each stream being of a different size and therefore quality. The streams are provided from a single capture device.

Description of the Related Art

It is known in the art to provide streams from capture devices, such as handled devices (e.g. mobile phones) equipped with cameras.

Streams provided by capture devices may be provided to other devices, which may be termed as viewing devices, for accessing (e.g. viewing) the streams.

For some viewing devices, the network connections that they have access to are such that it is not possible for them to receive the stream provided by the capture devices.

In addition, for some devices it may be desirable to access multiple streams of content which is generally available, and this may present difficulties given the volume of available streams associated with a particular event. Moderating services may be provided, with a viewing device relying on the moderating service to help filter the access to content. However for a moderating service difficulties can arise in moderating, in particular, live streamed content.

It is an aim to provide improvements associated with the provision of streams.

SUMMARY OF THE INVENTION

In an aspect there is provided a device for capturing an event, and for generating a first stream and a second stream representing the event, one of the first and second streams being a lower quality version of the other, and the streams being generated simultaneously.

The device may further comprise be configured to apply a timing mark to the first and second streams, wherein the first and second streams are synchronised such that the respective timing marks are synchronised.

The device may be associated with a video capture mechanism, the first and second streams being video streams.

The streams may be generated simultaneously for delivery to a public network.

The first and second streams may be simultaneously delivered synchronously.

The first and second streams may be delivered in dependence on a bandwidth available on at least one connection from the device.

The first and second streams may be delivered in dependence on a bandwidth available between the capture device and at least one intended recipient device. The quality of the first and/or the second stream may be adjusted so as not to exceed the total bandwidth available on the connection between the capture device and the at least one intended recipient device. The first and second streams may be sent to respective first and second recipient devices, the bandwidth available being a bandwidth on a connection from the capture device to one of the first and second recipient devices.

The first and second streams may be delivered on a single communication link.

The first and second streams may be generated on a communication link between the device and one or more servers.

There may be provided a system comprising a plurality of devices and a server, wherein each of the plurality of devices is adapted to generate first and second streams for communication to the server on a communication link between the respective device and the server. The first and second streams received from each device may be in synchronism. Each of the plurality of devices may receive a common timing mark.

The server may be provided with a controlling mechanism to transmit control signals to at least one of the plurality of devices, the control signal indicating whether to generate a single stream or the first and second streams in parallel at that device. The control signals may additionally indicate the destination of the first and second streams. The first and second streams may be intended for different recipient devices.

There is provided a method for capturing an event, comprising generating a first stream and a second stream representing the event, generating one of the first and second streams being a lower quality version of the other, and generating the streams simultaneously.

The method may further comprise associating the device with a video capture mechanism, the first and second streams being video streams.

The method may further comprise delivering the streams simultaneously for delivery to a public network.

The method may further comprise simultaneously delivering the first and second streams synchronously.

The method may further comprise delivering the first and second streams in dependence on a bandwidth available on at least one connection from the device.

The method may further comprise delivering the first and second streams in dependence on a bandwidth available between the capture device and at least one intended recipient device.

The quality of either the first or second stream may be adjusted so as not to exceed the total bandwidth available on the connection between the capture device and the at least one intended recipient device.

The method may further comprise sending the first and second streams to respective first and second recipient devices, the bandwidth being available on a connection from the capture device to one of the first and second recipient devices.

The method may further comprise delivering the first and second streams on a single communication link.

The method may further comprise delivering the first and second streams on a communication link between the device and one or more servers.

The method may include connecting a plurality of devices to a server, and further comprise adapting each of the plurality of devices to generate first and second streams for communication to the server on a communication link between the respective device and the server.

The first and second streams received from each device may be in synchronism.

The server may be provided with a controlling mechanism to transmit control signals to at least one of the plurality of devices, the control signal indicating whether to generate a single stream or the first and second streams in parallel at that device.

The control signals may additionally indicate the destination of the first and second streams.

The first and second streams may be intended for different recipient devices.

In examples there is provided a method of: receiving a plurality of data streams from a plurality of capture devices, wherein each data stream includes a low-quality data stream and a high-quality data stream, such that for each data stream both a low-quality and a high-quality version is received. This aspect may be referred to as low and high quality streams.

The example method may provide both the high-quality and the low-quality data streams as viewing streams. Only one of the high-quality or the low-quality data streams may be provided to a viewing devices in dependence on the capabilities of the viewing device.

The example method may further comprise processing the data stream, wherein the high-quality data stream is provide to a viewing device and the low-quality data stream is used for processing. The low-quality data stream may be received and processed more quickly than the high-quality data stream. The low-quality data stream may be used for processing and high quality data stream may be used for providing a viewing data stream to viewing devices. The processing may be moderating of the content of the data stream. The moderating of the data stream based on the low-quality stream may allow the moderating to be performed before the high-quality data stream is available to the viewed device.

A viewing device may receive a plurality of video streams for viewing. The captured data streams may be received by a streaming server, and the streaming server may provide video streams for viewing. The streaming server preferably selects a number of streams which it provides to the viewing device. A viewing device receiving a plurality of data streams may display one video stream in a large format display and one or more other data stream in a small format display (the small format being smaller than the large format, in terms of display size. The large format display may be derived from a high-quality data stream and the small format display may be derived from a low quality data stream. The small format display may be so-called thumbnail displays. The large and small format display may be video displays displaying moving images.

The plurality of capture devices may be independent of each other. The plurality of capture devices may provide the data streams without any request to do so.

A video steaming server may receive a plurality of video streams, the video stream being of different quality levels, and the received video streams of different quality levels may be grouped according to their quality levels, and synchronised according to such groups.

BRIEF DESCRIPTION OF THE FIGURES

The invention is now described by way of reference to the following figures, in which:

FIG. 4 illustrates an exemplary implementation of the concept of FIG. 2; and

FIG. 5 illustrates an example display of a handset receiving low and high quality stream.

DESCRIPTION OF PREFERRED EMBODIMENTS

Figure 1:
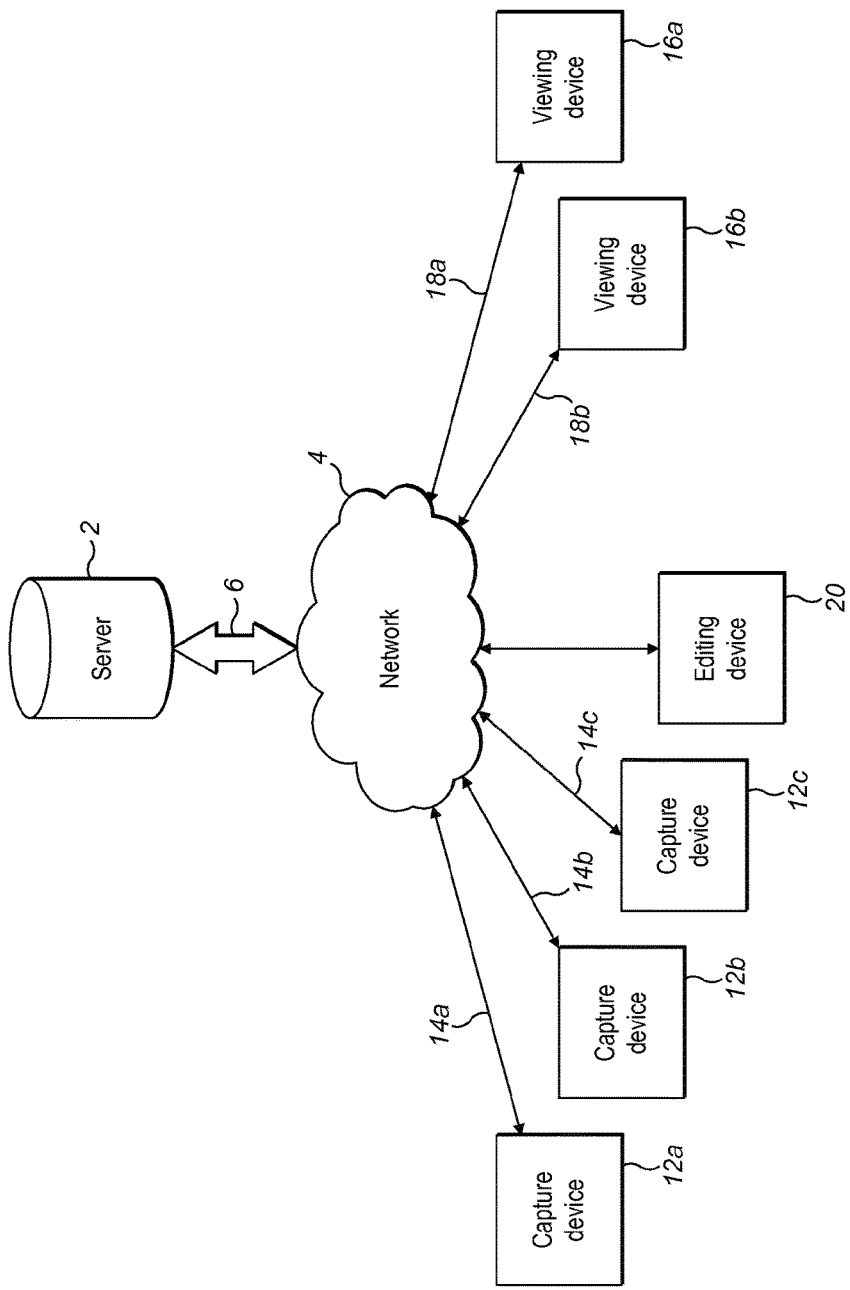
FIG. 1 illustrates an exemplary architecture in which described examples and embodiments may be implemented.

With reference to FIG. 1 there is illustrated a system architecture within which embodiments may be implemented.

With reference to FIG. 1 there is illustrated: a plurality of devices, labelled capture devices, denoted by reference numerals 12a, 12b, 12c; a plurality of devices, labelled viewing devices, denoted by reference numerals 16a, 16b; a device, labelled editing device, denoted by reference numeral 20a; a network denoted by reference numeral 4; and a server denoted by reference numeral 2.

Each of the devices 12a, 12b, 12c is referred to as a capture device as in the described embodiments of the invention the devices capture content. However the devices are not limited to capturing content, and may have other functionality and purposes. In examples each capture device 12a, 12b 12c may be a mobile device such as a mobile phone.

Each of the capture devices 12a, 12b, 12c may capture an image utilising a preferably integrated image capture device (such as a video camera), and may thus generate a video stream on a respective communication line 14a, 14b, 14c. The respective communication lines 14a, 14b, 14c provide inputs to the network 4, which is preferably a public network such as the Internet. The communication lines 14a, 14b, 14c are illustrated as bi-directional, to show that the capture devices 12a, 12b, 12c may receive signals as well as generate signals.

The server 2 is configured to receive inputs from the capture devices 12a, 12b, 12c as denoted by the bi-directional communication lines 6, connected between the server 2 and the network 4. In embodiments, the server 2 receives a plurality of video streams from the capture devices, as the signals on lines 14a, 14b, 14c are video streams.

The server 2 may process the video streams received from the capture devices as will be discussed further hereinbelow.

The server 2 may generate further video streams on bi-directional communication line 6 to the network 4, to the bi-directional communication lines 18a, 18b, associated with the devices 16a, 16b respectively.

Each of the devices 16a, 16b is referred to as a viewing device as in the described embodiments of the invention the devices allow content to be viewed. However the devices are not limited to providing viewing of content, and may have other functionality and purposes. In examples each viewing device 16a, 16b may be a mobile device such as a mobile phone.

The viewing devices 16a and 16b may be associated with a display (preferably an integrated display) for viewing the video streams provided on the respective communication lines 18a, 18b.

A single device may be both a capture device and a viewing device. Thus, for example, a mobile phone device may be enabled in order to operate as both a capture device and a viewing device.

A device operating as a capture device may generate multiple video streams, such that a capture device such as capture device 12a may be connected to the network 4 via multiple video streams, with multiple video streams being provided on communication line 14a.

A viewing device may be arranged in order to receive multiple video streams. Thus a viewing device such as viewing device 16a may be arranged to receive multiple video streams on communication line 18a.

A single device may be a capture device providing multiple video streams and may be a viewing device receiving multiple video streams.

Each capture device and viewing device is connected to the network 4 with a bi-directional communication link, and thus one or all of the viewing devices 16A, 16B may provide a signal to the network 6 in order to provide a feedback or control signal to the server 2. The server 2 may provide control signals to the network 4 in order to provide control signals to one or more of the capture devices 12a, 12b, 12c.

The capture devices 12a, 12b, 12c are preferably independent of each other, and are independent of the server 2. Similarly the viewing devices 16a, 16b are preferably independent of each other, and are independent of the server 2.

The capture devices 12a, 12b, 12b are shown in FIG. 1 as communicating with the server 2 via a single network 4. In practice the capture devices 12a, 12b, 12c may be connected to the server 2 via multiple networks, and there may not be a common network path for the multiple capture devices to the server 2. Similarly the viewing devices 16a, 16b may be connected to the server 2 via multiple networks, and there may not be a single common network path from the server 2 to the viewing devices 16a, 16b.

The system architecture of FIG. 1 may be used to stream live content from capture devices to the server, and then for viewing devices to access the live content in streams from the server.

Where bandwidth permits, a particular device may be capable of broadcasting a very high quality stream. However, this may mean that viewers with a low quality connection are unable to watch. In such situations, having a capture device that uses its ready access to bandwidth to provide both a low and a high quality version of the content will allow more people to watch without needing any expensive server-side on-the-fly transcoding which, given the quantities of live streams possible, would be difficult to scale.

Further, where bandwidth permits and the where the content can be provided by the capture device to the server using a non-segmented streaming technology, a low quality stream may be provided alongside the high quality version such that the low quality version is available to moderators, directors, etc. earlier than the high quality one. This gives moderators/etc. more time in which to check, manipulate, edit content before it is made available to viewers.

Technical complications arising from this include the need to maintain separate synchronisation domains—one for low quality stream and another for the high quality stream—and the ability to map editorial decisions from one to the other. A moderator or director having made a decision based on their view of the low quality stream will expect that action to be transposed, at the right moment, to the high quality stream.

Figure 2:
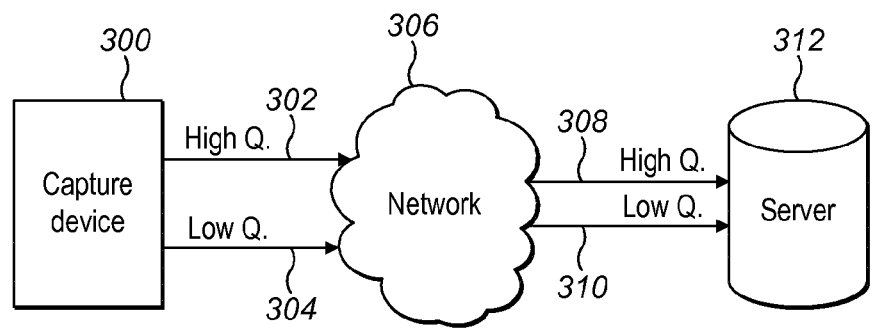
FIG. 2 illustrates an exemplary concept.

As illustrated in FIG. 2, a capture device 300 may provide both a high-quality stream 302 and a low-quality stream 304 to a network 306, and the network 306 may provide the associated high-quality stream 308 and low-quality stream 310 to a server 312. The capture device 300 may correspond to one of the capture devices 12a,12b,12c of FIG. 1, the network 306 may correspond to the network 4 of FIG. 1, and the server 312 may correspond to the server 2 of FIG. 1.

Figure 3:
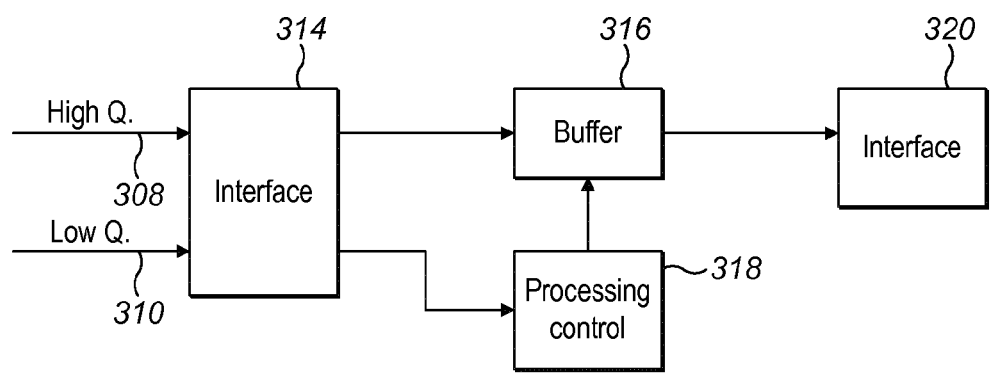
FIG. 3 illustrates an exemplary implementation of the concept of FIG. 2.

As illustrated in FIG. 3, the server 312 may include an interface 314, a buffer 316, a processing control module 318, and an interface 320.

The server 312 may receive the high-quality and low-quality streams 308,310 associated with the single capture device at the interface 314, and the processing control module 318 may process the stream in dependence on the low-quality stream information only, received on line 310. The high-quality stream information on line 308 is delivered to a buffer 316. In dependence on the processing control module 318, the buffer 316 delivers the high-quality stream to the interface 320 for further streaming to a viewing device.

This takes advantage of the fact that the low-quality stream may be available to the processing control module 318 quicker, so that processing can take place in advance of the high-quality stream being received by the buffer 316.

FIG. 4 illustrates an alternative schematic of the route of data through to an exemplary viewing device. Here it is shown that the server 312 includes an interface 322, a processing block 324, another interface 326, a network 328 (which may be the same as the network 306 of FIG. 2), and a viewing device 330 (which may correspond to a viewing device 16a, 16b of FIG. 1.

FIG. 4 illustrates in general that the high-quality and low-quality streams 302, 304 are received by the interface 322, are both provided for processing in the processing block 324, and then are both provided to the interface 326 which is connected to the network 328 for delivery to the viewing device 330. Both the high-quality and low-quality streams may be provided to the viewing device.

FIG. 5, which relates to FIG. 4, shows that on a display 332 of the viewing device 330 there may be provided a large display portion 334 associated with a high-quality stream, and a small display portion 336 associated with a low-quality stream. The high-quality stream is automatically routed to the large display portion 334, and the low-quality stream is automatically routed to the smaller display portion 336. Any stream which is directed to the larger display portion 334 is derived from a high-quality stream, and any stream which is directed to the smaller display portion 336 is derived from a low-quality stream.

For the provision of low and high quality streams for a viewer, for contributor end users a wider audience can thus be reached without needing to do anything. High quality video can be provided to those able to receive it, but others may not be able to receiver it (for example they may only be on a cellular link which does not provide for high quality streams). This technique prevents members of an audience becoming frustrated at the inability to access content wherever and whenever. For viewer end users, fewer "buffering" headaches are encountered.

For the provision of low and high quality streams at a central server, for customers greater editorial control may be provided given the greater amount of time in which to make decisions. For viewers, a better experience is provided since content is more carefully edited and produced.

All the examples and embodiments described herein may be implemented as processed in software. When implemented as processes in software, the processes (or methods) may be provided as executable code which, when run on a device having computer capability, implements a process or method as described. The execute code may be stored on a computer device, or may be stored on a memory and may be connected to or downloaded to a computer device.

Examples and embodiments are described herein, and any part of any example or embodiment may be combined with any part of any other example or embodiment. Parts of example are embodiments are not limited to being implemented in combination with a part of any other example or embodiment described. Features described are not limited to being only in the combination as presented.

The invention claimed is:

1. A system comprising:
a plurality of capture devices each for capturing an event, each capture device configured to generate a first stream representing the captured event in a first synchronization domain and to generate a second stream being a lower quality version of the first stream and representing the captured event in a second synchronization domain separate from the first synchronization domain;
a server comprising:
an input interface for receiving the first stream from the capture device as-live and for receiving the second stream from the capture device, wherein the first stream is intended for a recipient device and the second stream is for editing the first stream;
a buffer for receiving the first stream from the interface; and
a processing control module stored in memory and configured to: receive the second stream from the interface, process the second stream in advance of receipt of the first stream by the buffer by determining an edit based on the second stream, transpose the edit, and apply the transposed edit to the first stream in the buffer such that an edit at a time instant of the second stream is applied to the first stream at a corresponding time instant of the first stream, and
an output interface for streaming the first stream as-live from the buffer; and
at least one recipient device for receiving the streamed first stream with the transposed edit, wherein the second stream is not delivered to any recipient device.

2. The processing device of claim 1 wherein a control signal indicates a destination of the first stream.

3. The system of claim 1 further comprising:
an editing device for editing the streams, the editing device being connected to the processing control module.

4. The system of claim 1 wherein the plurality of capture devices are further configured to apply first and second timing marks to each of the first and the second streams corresponding to the first and second synchronization domains, respectively, wherein the first and the second timing marks allow the processing control module to transpose the determined edit at a timing instant of each of the first and second streams which correspond.

5. The system of claim 1 wherein the first stream and the second stream are generated by each of the plurality of capture devices in dependence on bandwidth available on at least one connection from each capture device.

6. The system of claim 5 wherein the first stream is sent to a first recipient device, the bandwidth available being bandwidth on a connection from the at least one capture device to the first recipient device.

7. The system of claim 1 wherein the first and the second streams are generated in dependence on bandwidth available between the at least one capture device and at least one intended recipient device.

8. The system of claim 7 wherein quality of one or both of the first and the second streams is adjusted so as not to exceed total bandwidth available on a connection between the at least one capture device and the at least one intended recipient device.

9. A method for capturing an event, comprising:
capturing, at each of a plurality of capture devices, an event;
generating, at each of the plurality of capture devices, an as-live first stream representing the captured event in a first synchronization domain;
generating, at each of the plurality of capture devices, a second stream being a lower quality version of the first stream, representing the captured event in a second synchronization domain separate from the first synchronization domain, wherein the first stream is for a recipient device and the second stream is for use in editing the first stream;
receiving, at a server, the as-live first stream;
receiving, at a server, the second stream;
processing the second stream in advance of receipt of the first stream by determining an edit based on the second stream;
transposing the determined edit to the first stream in the buffer such that an edit at a time instant of the second stream is applied to the first stream at a corresponding time instant of the first stream; and
streaming the as-live first stream from the buffer to the recipient device with the transposed edit applied, wherein the second stream is not delivered to any recipient device.

10. The method of claim 9 further comprising:
delivering the first and the second streams in dependence on a bandwidth available on at least one connection from a capture device.

11. The method of claim 9 further comprising:
delivering the first and the second streams in dependence on a bandwidth available between a capture device and at least one intended recipient device, wherein quality of one of the first stream and the second stream is adjusted so as not to exceed total bandwidth available on a connection between the capture device and the at least one intended recipient device.

12. The method of claim 9 further comprising:
sending the first stream to a first recipient device, in dependence on a bandwidth available, the bandwidth available being a bandwidth on a connection from a capture device to the first recipient device.

13. The method of claim 9 each of the plurality of capture devices receives a common timing mark.

14. The method of claim 9, further comprising:
transmitting control signals indicating whether to generate one of a single stream, and the first and second streams in parallel at a capture device.

15. The method of claim 9 further comprising:
transmitting a control signal, wherein the control signal indicates a destination of the first stream.

* * * * *